(12) United States Patent
Houston et al.

(10) Patent No.: US 6,272,317 B1
(45) Date of Patent: Aug. 7, 2001

(54) METHOD AND SYSTEM FOR PROVIDING SATELLITE COVERAGE USING FIXED SPOT BEAMS AND SCANNED SPOT BEAMS

(75) Inventors: Sam W. Houston; Carl S. Anselmo, both of Rancho Palos Verdes; Daniel P. Sullivan, Palos Verdes Estates, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/159,332

(22) Filed: Sep. 23, 1998

Related U.S. Application Data (63) Continuation-in-part of application No. 08/867,672, filed on Jun. 2, 1997.

(51) Int. Cl.$^7$ ............................................. H04B 7/185
(52) U.S. Cl. ........................ 455/13.1; 455/12.1; 455/427; 342/354
(58) Field of Search .................................. 455/427, 12.1, 455/13.2, 98, 429, 63, 13.1; 342/354, 154, 356

(56) References Cited

U.S. PATENT DOCUMENTS

| | | | |
|---|---|---|---|
| 4,188,578 | * | 2/1980 | Reudink et al. ...................... 370/323 |
| 4,231,040 | * | 10/1980 | Walker ................................. 342/373 |
| 4,259,741 | * | 3/1981 | Kawai ................................. 370/323 |
| 4,315,262 | * | 2/1982 | Acampora et al. ................... 342/352 |
| 4,691,882 | | 9/1987 | Young . |
| 4,737,733 | * | 4/1988 | LaPrade ............................... 330/277 |
| 4,843,397 | * | 6/1989 | Galati et al. ............................ 342/59 |
| 4,965,587 | * | 10/1990 | Lenormand et al. ................ 342/372 |
| 5,008,952 | | 4/1991 | Davis et al. . |
| 5,038,150 | | 8/1991 | Bains . |
| 5,129,095 | | 7/1992 | Davis et al. . |
| 5,233,626 | | 8/1993 | Ames . |
| 5,280,297 | * | 1/1994 | Profera, Jr. .......................... 343/754 |
| 5,444,449 | * | 8/1995 | Poskett et al. ....................... 342/354 |
| 5,504,938 | | 4/1996 | Redden . |
| 5,548,294 | | 8/1996 | Sturza . |
| 5,551,624 | | 9/1996 | Horstein et al. . |
| 5,584,046 | * | 12/1996 | Martinez et al. ................... 455/13.1 |
| 5,602,838 | | 2/1997 | Kartalopoulos . |
| 5,646,853 | | 7/1997 | Takahashi et al. . |
| 5,722,042 | | 2/1998 | Kimura et al. . |
| 5,736,959 | | 4/1998 | Patterson et al. . |
| 5,822,680 | | 10/1998 | Stuart et al. . |
| 5,860,058 | | 1/1999 | Daniel et al. . |
| 5,906,337 | | 5/1999 | Williams et al. . |
| 5,915,020 | | 6/1999 | Tilford et al. . |
| 5,915,217 | | 6/1999 | Wiedeman et al. . |
| 5,924,014 | | 7/1999 | Vanden Heuvel et al. . |
| 5,929,804 | * | 7/1999 | Jones et al. .......................... 342/354 |
| 5,936,588 | * | 8/1999 | Rao et al. ............................. 343/754 |
| 5,936,592 | * | 8/1999 | Ramanujam et al. ............... 343/853 |
| 5,974,316 | * | 10/1999 | Tayloe et al. ........................ 455/429 |
| 6,032,041 | | 2/2000 | Wainfan et al. . |
| 6,125,261 | * | 9/2000 | Anselmo et al. .................... 455/12.1 |

* cited by examiner

*Primary Examiner*—Dwayne Bost
*Assistant Examiner*—Sonny Trinh
(74) *Attorney, Agent, or Firm*—V. D. Duraiswamy; M. W. Sales (57) ABSTRACT

A satellite-based communications system operating at high data rates includes a plurality of communications satellites each having an uplink and a downlink antenna for receiving and transmitting a plurality of spot beams which may be fixed or scanned. The fixed beams may be directed to areas of high satellite use. The scanned beams may be rapidly scanned between areas of use insufficient to support a dedicated beam. The scanned beam allows potentially nearly ubiquitous coverage by using high frequency beams. To rapidly scan, beam forming networks have a plurality of phase coefficients that may be changed so that the angle of the beam may change. A controller coupled to the beam forming network may be used to change the phase coefficients in response to beam inputs such as the desired beam and configurations of the other beams on the satellite.

12 Claims, 7 Drawing Sheets

— FIXED SPOT BEAMS
---- SCANNED SPOT BEAMS

METHOD AND SYSTEM FOR PROVIDING SATELLITE COVERAGE USING FIXED SPOT BEAMS AND SCANNED SPOT BEAMS

CROSS-REFERENCE TO RELATED APPLICATIONS

This invention is a continuation-in-part of co-pending application Ser. No. 08/867,672 FILED Jun. 2, 1997 entitled "Method And System For Communicating High Data Rate In a Satellite-Based Communications Network", having the same assignee as the present invention, and which is hereby incorporated by reference.

TECHNICAL FIELD

This invention relates to methods and systems for communicating high rate data to customers in satellite-based communications networks.

BACKGROUND OF THE INVENTION

A number of applications continue to drive the need for high-speed data transport. Industry specific examples include remote film editing, medical image transport, and financial service data consolidation and backup. Business communications and training needs further accelerate information transfer needs across all sectors. As business, government and educational institutions disseminate more information, greater importance is attached to data transfer. In this environment, reliable, high-speed video and data transport becomes even more critical.

Furthermore, a tremendous growth in Internet traffic has caused a strain on the capacity of telephony networks. Network shortcomings include network outages, insufficient access bandwidth, and insufficient internode bandwidth. Currently, providers need to make significant investments, as well as experience installation delays, to upgrade network infrastructure, yet they cannot pass the costs on to the end users.

Corporate LANs/WANs also generate an insatiable demand for higher bandwidth. The demand for bandwidth goes up as more and more users are connected. The users, in turn, demand more services and improved network speed. Personal computers are being used to process not only text, but graphics and video as well, all on networks that are increasingly global. Widespread implementation of corporate intranets and extranets further drive the move to increased bandwidth applications. High-speed networking is also driven by the growth of video distribution, client/server technology, decentralized systems, increased processing power and developments in storage capacity.

Thus, it is important to relieve congestion among the heavily used communications links in high-density areas and to bring such service to isolated rural areas which have not been able to participate fully in the communications world. While existing satellite systems offer ubiquitous service, they do not offer direct connection to the end user at moderate to high data rates. Existing Fixed Satellite Service (FSS) systems employ wide channel bandwidths and relatively large beamwidths making them more suited to point-to-point trunking service rather than to end user connectivity. The wide area coverage, limited Equivalent Isotropically Radiated Power (EIRP), and constrained flexibility of these systems makes any attempt to serve many small users both inefficient and costly.

The emerging cellular type satellite services serve a very large number of potential subscribers but only at very low data rates. The on-board processing and packet-switched nature of their signal structure severely limits the practical user data rates that can be accommodated within the technology limitations of the processor. Thus, there exists a need for a satellite communications system that serves the demand for high data rate business users including the high-end individual as well as small business users that demand direct and affordable connection.

It would therefore be desirable to provide a satellite-based communications network providing reliable high data rate communications service to customers throughout the world while maintaining flexibility to reconfigure the beam patterns often to tailor the beam pattern according to user needs.

SUMMARY OF THE INVENTION

In carrying out the above features, and advantages of the present invention, a satellite-based communications network provides a plurality of communications satellites each having uplink and downlink antennas capable of receiving and transmitting a plurality of signals utilizing a plurality of beams having fixed spot beams and scanned spot beams to a plurality of spot coverage areas and a plurality of scanned spot areas respectively at a predetermined range of frequencies. The plurality of satellites each have receiving and transmitting beam forming networks coupled to the uplink and downlink antennas respectively. The antennas have adjacent reconfigurable receiving and transmitting antenna elements. A controller located on the satellite is coupled to said beam forming network, the controller selecting either a fixed spot beam or a scanned spot beam.

One advantage of the invention is that the satellite system allows the use of both fixed and scanned spot beams from the same satellite and same antenna. This is important in high frequency applications such as those in V-band because the beams in high frequency bands generate narrow beams. Thus, blanket coverage for large land areas such as the continental United States (CONUS) is difficult without an inordinate number of satellite beams. The present invention allows fixed coverage over high traffic area while allowing scanned beams to be quickly moved between areas not requiring a dedicated fixed beam.

The above object and other objects, features and advantages of the present invention are readily apparent from the following detailed description of the best mode for carrying out the invention when taken in connection with the accompanying drawings.

DETAILED DESCRIPTION OF THE INVENTION

Figure 1:
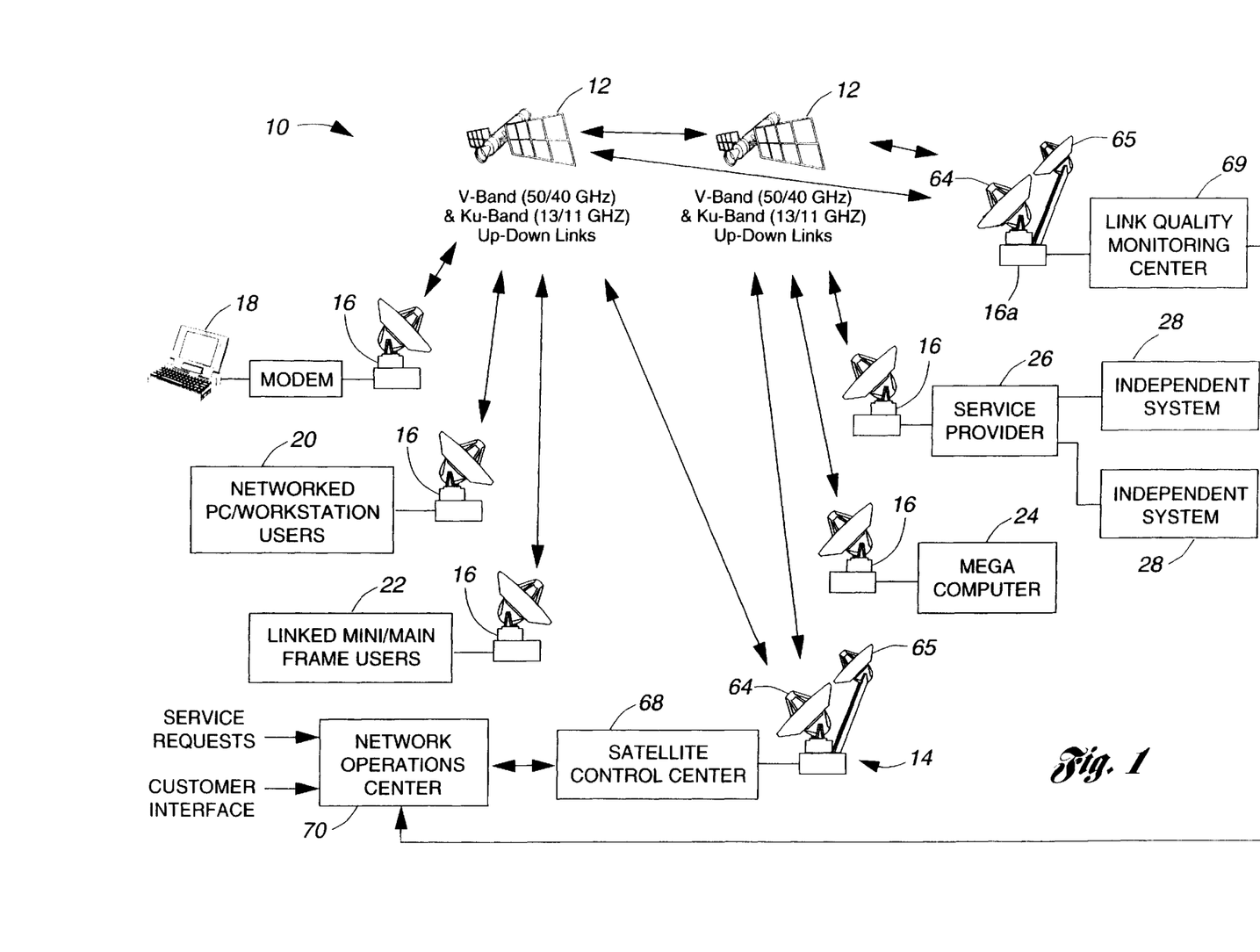
FIG. 1 is a diagrammatic representation illustrating a satellite communication system of the present invention.

Referring to FIG. 1, a satellite-based communications network 10 with a typical geometry for practicing the present invention is diagrammatically illustrated. In general, the network 10 includes a plurality of communications satellites 12 in geosynchronous orbit, a ground station 14 for controlling and maintaining operation of each of the plurality of satellites 12, and a plurality of user terminals 16. The user terminals 16 may interconnect with a single computer 18, a group of networked PC/Workstation users 20, a group of linked mini/main frame users 22, a mega computer 24, or a service provider 26 that provides service to any number of independent systems 28.

The geosynchronous satellites 12 are positioned in orbit locations supporting Fixed Satellite Service (FSS) coverage for domestic service and accommodating a primary range of frequencies and a secondary range of frequencies, such as 50/40 GHz V-band as well as 13/11 GHz Ku-band operation. The locations of satellites 12 must accommodate emissions along with other co-orbiting satellites, and must support service to and from high population metropolitan and business areas throughout the world. The ground terminal elevation angles to satellites 12 must be 30 degrees or greater to minimize adverse propagation effects especially in the presence of rain and other disturbances. The preferred orbit locations include four satellites over the U.S., two each at 99EW and 103EW. To accommodate global growth and provide coverage to western Europe, central Europe, Middle East, and Africa, the preferred orbit locations further include eight other satellites, two each at 10EE and one at 63EW, 53EW, 48EE, 63.5EE, 115.4EE, and 120.6EE.

Figure 2:
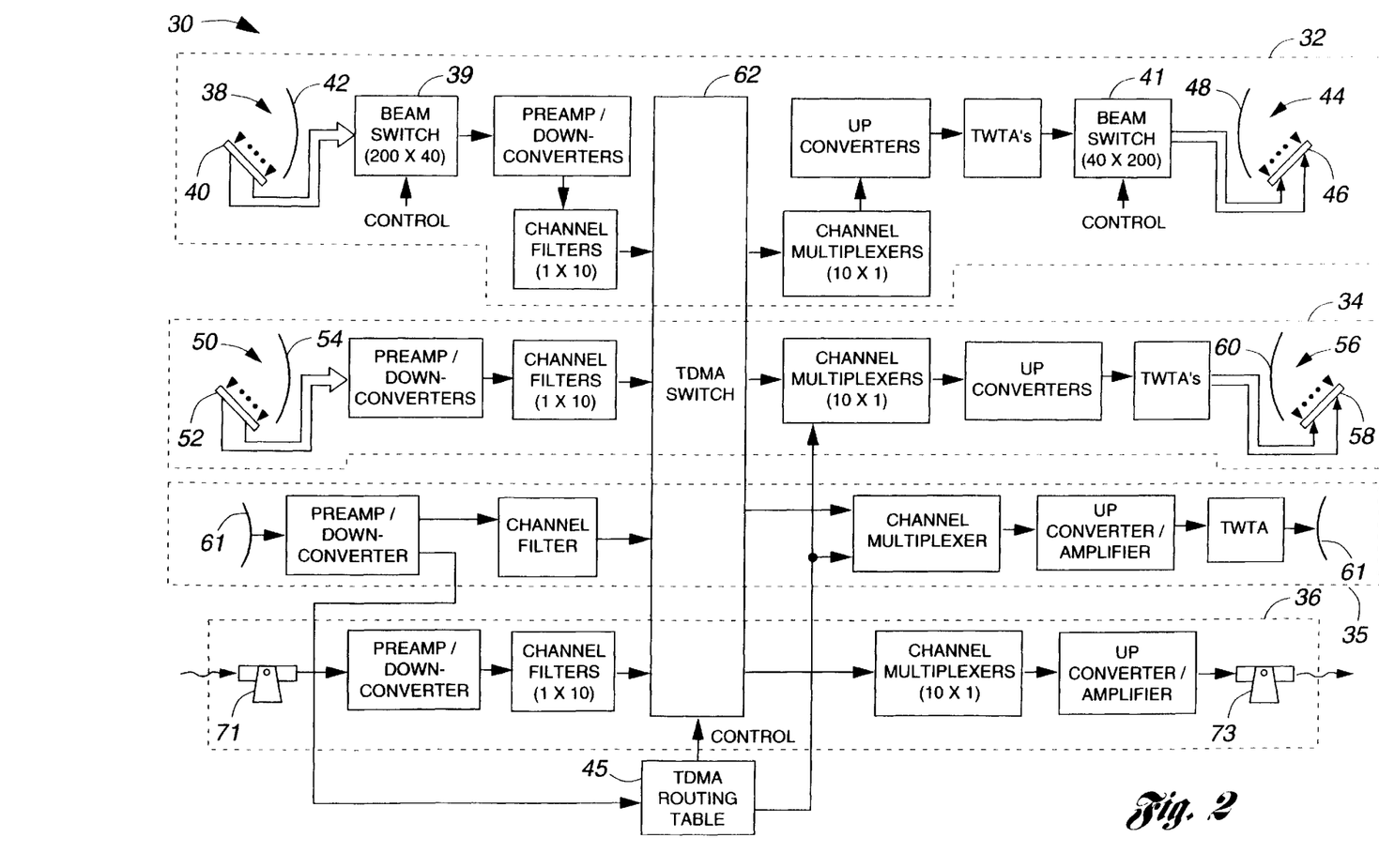
FIG. 2 is a schematic block diagram illustrating a communications subsystem within the satellites of the present invention.

Each of the satellites 12 are high power satellites having 15–20 KW payload capability, such as an HS 702L High Power Spacecraft manufactured by Hughes Electronics Corporation, the assignee of the present invention. The HS 702L is a three-axis body-stabilized spacecraft that uses a five panel solar array system, along with outboard radiator panels attached to the main body to dissipate heat generated from the high powered Traveling Wave Tubes (TWTs). A schematic block diagram illustrating a communications subsystem, or payload, 30 within satellites 12 is shown in FIG. 2.

The payload 30 includes a primary communication payload 32, a secondary communication payload 34, an interhemisphere link 35, and an intersatellite link 36. Primary communication payload 32 supports the majority of the communications signals. Secondary communication payload 34 is utilized for thin route satellite traffic and as back up for weather outages of primary communication payload 32. Primary communication payload 32 operates preferably in the 50/40 GHz FSS region, or any other similar high frequency range, to provide high capacity service and utilizes 3 GHz of spectrum (47.2 to 50.2 GHz) for uplinks and another 3 GHz of spectrum (38.6 to 41.6 GHz) for downlinks. Data rates from 1.544 Mbps (equivalent to T1) to 155 Mbps (OC3 equivalent) can, thus, be supported. Users operating at data rates below the T1 level can be accommodated by submultiplexing the signals at the user terminal 16. Secondary communication payload 34 preferably operates in the 13/11 Ku-band FSS region with 500 MHz of bandwidth to provide ubiquitous thin route and high link availability service and connection between the northern and southern hemispheres.

Primary communication payload 32 includes an uplink antenna 38 and a downlink antenna 44 for receiving and transmitting spot beams carrying signals at the primary range of frequencies. Narrow spot beams allow a greater power to be received and transmitted in the area it covers, thereby supporting higher data rates than those of wider beams. A single antenna can produce many spot beams. Many small feed horns are positioned so that their signals are reflected in narrow beams by a parabolic dish of the antenna. Different antenna feeds are switched on and off, via uplink antenna beam switch 39 and downlink antenna beam switch 41, thereby selecting the spot beam to be used in each case. Not only do satellites with multiple narrow beam antennas give a higher EIRP per beam, but the same frequency and bandwidth can also be reused several times for different portions of the earth. Even further, if the spot beams also have dual polarization capability, the number of beams is doubled, thereby increasing spectral reuse also by a factor of two. For example, for twenty spot beams each with dual polarization, the spectral reuse if forty times.

Figure 3:
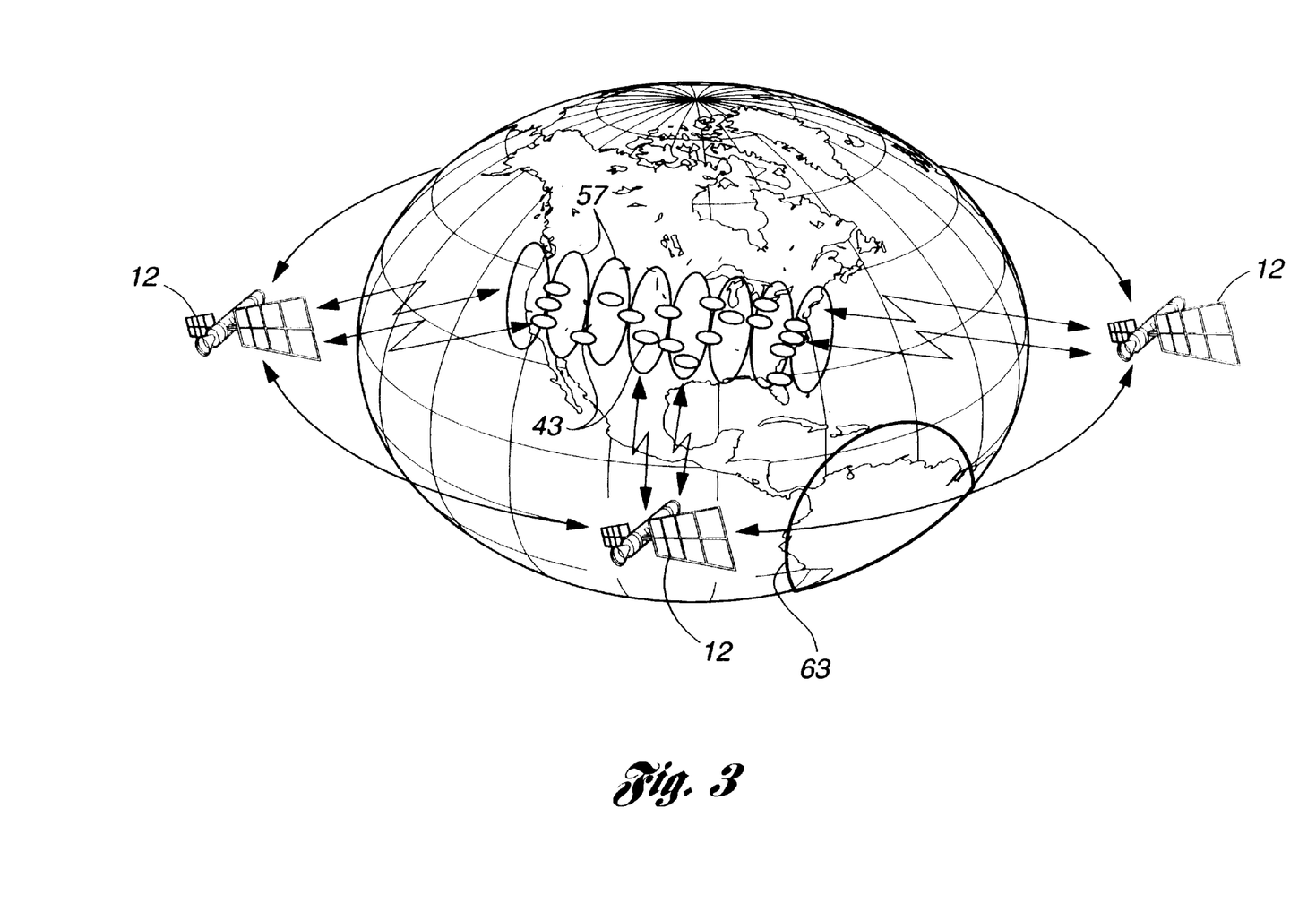
FIG. 3 is a schematic illustration of the constellation of communications satellites utilized in the present invention.

In the present invention, a surface, or area, such as CONUS, to receive communications services of the present invention, is divided into a plurality of coverage areas 43, as shown in FIG. 3. Uplink and downlink antennas 38,44, respectively, can support a predetermined number of coverage areas 43, e.g., 200. However, a subset of the plurality of coverage areas 43 is chosen to be used by uplink and downlink antennas 38,44, respectively, to support communications services in predetermined metropolitan areas having heavy traffic. This configuration is controlled by a routing table 45 stored on the payload 30. Thus, the spot beams 43 are semi-fixed in position, until reconfigured at a later time. Reconfiguration of uplink and downlink antenna beam switches 39,41, respectively, is possible by updating routing table 45 as needed. This updated information is transmitted by ground station 14. Thus, usage of available satellite resources, such as weight and power, are utilized for only those beams that are selected and active.

Preferably, uplink antenna 38 and downlink antenna 44 each consists of an east-mounted and a west-mounted multifeed antenna assembly having a multibeam array 40,44 and a reflector 42,48 to provide CONUS and coastal coverage. The offset parabolic reflectors 42,48 are deployed from the east and west side of the satellite 12, yet the feed arrays 40,44 are fixed to the nadir face and do not deploy. Each reflector 42,48 is populated by a fifty-one horn dual circularly polarized feed array 40,44. Each horn of the feed array 40,44 is diplexed for both transmit and receive frequencies. In addition, each horn provides either a single sense of circular polarization or dual circular polarization. Consequently, there are 400 total input ports to the 200 horns that comprise the antenna assemblies 38,44. Alternatively, uplink and downlink antennas 38,44 may comprise a phased array antenna.

As discussed above, antenna beam switches 39, 41 select twenty spot beams from the 200 horn array, each with dual circular polarization to provide forty beams per satellite. Each beam and each polarization makes full use of the 3 GHz of spectrum with a total of forty times spectrum reuse (120 GHz) in all. The selected forty spot beams 43 are directed towards major metropolitan population centers and business areas included within the ubiquitous area, as shown in FIG. 3. In addition, any twenty beams included in the uplink array of receive beam locations and any twenty of the array of downlink beam locations can be selected independently of each other on orbit to accommodate variations in traffic or satellite relocation at a later date.

Each beam is divided into ten Frequency Division Multiple Access (FDMA) channels, with each channel nominally 300 MHz wide, including guard bands. Each FDMA channel is divided into 100 Time Division Multiple Access (TDMA) channels, with each TDMA channel having a nominal burst rate of 150 Mbps. Thus, a total of 100 users may use the same frequency channel in the same beam. Upon subscribing to the service provided by the network 10 of the present invention, a dedicated communications link is assigned to a user at a source location in one of the coverage areas 43 and a user at a destination location in another one of the coverage areas 43. This dedicated link is assigned an exclusive time channel in one of the frequency channels for transmitting and receiving communications signals.

Satellite payload 30 includes a Time Division Multiple Access (TDMA) circuit switch 62 operating at a suitable intermediate frequency (IF). Circuit switch 62, driven by routing table 45, provides interlinking of all beams, services and users and dedicated point-to-point and point-to-multipoint services. Circuit switch 62 circuit switches signals to be transmitted either to the same uplink beam as the source signal was transmitted from or by another downlink beam based on the time interval assigned the source signal according to routing table 45. Circuit switch 62 is gated within the time domain to provide precise windows of time to different desired outputs. Loopback information is included within the transmission to provide necessary synchronization of user terminals 16 with the satellites 12. Circuit switch 62 also routes crosslink traffic as well as traffic to and from the hemispheric coverage beam, discussed below.

As with primary communication payload 32, secondary communication payload 34 includes an uplink antenna 50 having a multibeam array 52 and a reflector 54, and a downlink antenna 56 having a corresponding multibeam array 58 and reflector 60. Secondary communication coverage is preferably provided by two nadir-mounted dual-gridded reflector antennas, each illuminated by eight diplexed feeds for transmit and receive frequencies. Secondary communication antennas 50,56 provide a total of eight dual polarized, elliptical area (3E×1E) coverage beams 57, as shown in FIG. 3, for uplink and downlink services. Thus, secondary communication payload 34 provides an eight-fold reuse of the spectrum for a total useable bandwidth of 4 GHz.

To provide for inter-hemisphere interconnectivity, inter-hemisphere link 35 includes a single steerable horn 61, diplexed for transmit and receive frequencies providing one dual linearly polarized spot beam for uplink and downlink services. Horn 61 transmits a 6E×6E, 13/11 GHz area beam 63 towards the southern hemisphere, allowing thin route coverage of southern regions such as South America, as shown in FIG. 3. This beam may also provide north-south interconnection coverage to areas such as Europe and Africa.

Intersatellite link 36 is included so that traffic from one satellite covering a particular region or selected metropolitan areas can be linked to a second satellite covering the same or other areas and regions. Intersatellite link 36 may be an optical (or laser) link operating in the 1.6 micron region via two 9 inch laser-telescope assemblies 71,73. Alternatively, intersatellite link 36 may be a radio frequency (RF) link operating in the 60 GHz region. Data is frequency converted and multiplexed to provide a maximum 3 Gbps data rate for inter-satellite connectivity.

Returning to FIG. 1, user terminals 16 include a primary antenna 64 for communicating with each of the satellites 12 in the primary range of frequencies, such as V-band frequencies. Thus, user terminals support data rates between 1.544 Mbps (equivalent to T1) and 155 Mbps (OC3 equivalent) via V-band antenna 64. Data rates below T1 are accommodated at user terminals 16 by submultiplexing the data to T1 (or higher) rates before transmission. Each of the user terminals 16 time-share the FDMA channels, with 100 TDMA channels in each 300 MHz FDMA channel. Since each TDMA channel supports a data rate of 1.544 Mbps, the network 10 provides a data throughput rate of 1.544 Gbps (100×1.544 Mbps×10) for each of the forty effective beams per satellite 12. For each FDMA channel, the channel data rate is 274.8 Mbps, which includes overhead for coding, transport protocol, network signaling, and access management. Uplink operation at each of the user terminals 16 operates in a burst mode at a data rate determined by the full FDMA channel plan.

Thirty watt high power amplifiers (HPA's) operate at saturation in the user terminals 16, with the user terminals 16 in each beam operating time shared on one of ten unique carrier frequencies. Out of band emissions are minimized in each user station 16. Each of the forty 3.0 GHz bandwidth beams is received and down converted, routed through circuit switch 62, upconverted, and amplified by a TWTA associated with a particular downlink beam. The downlink beams each have ten carriers, one for each FDMA channel. Each TWTA uses linearizers and operates with sufficient output backoff to ensure minimum out of band emissions and intermodulation products.

User terminals 16a that cannot tolerate the expected loss of transmission due to weather outages further include a secondary communication antenna 65 for transmitting and receiving signals at the secondary range of frequencies. Secondary communication antenna 65 may or may not be the same as the primary communication antenna 64. User terminals 16a subscribing to this type of service include a link quality monitoring center 69 to monitor the quality of service of primary communication payload 32 and routes it to a higher quality link, i.e., secondary communication payload 34, in the presence of adverse link propagation disturbance. The rerouting of traffic to a higher availability link is accomplished by communicating such conditions to ground station 14.

As discussed above, each of the satellites 12 are also in communication with a ground station 14. Ground station 14 has two functions. Satellite control center 68 manages the health and status of all the satellites 12 and maintains their orbits. If rain attenuation exceeds the link budget allocation at the primary range of frequencies, e.g., 50/40 GHz, the satellite 12 shall be commanded by satellite control center 68 to provide service via the secondary communication payload 34 until the weather front passes, at which time the satellite 12 is restored to primary services. Secondary communication payload 34 resource is then free to backup another metropolitan area, if needed, or to provide ubiquitous thin route services over CONUS. To be an effective backup, secondary communication payload 34 must have a sufficient capacity, on the order of 10% of the primary communication payload 32, in order to backup the entire service.

Network operations center 70 of ground station 14 provides resource management, fault management, accounting, billing, customer interfacing, and service. Ground station 14 is preferably placed in low-rain sections of friendly countries so as to provide line-of-sight communications with each of the satellites 12.

The network of the present invention provides communications capabilities that will significantly contribute to the National and Global Information Infrastructures. It provides high data rate communications to customers throughout the United States and most of the rest of the world as well. The system provides true broadband capability, including high speed access to the Internet in particular and high-technology telecommunications in general. The innovative design of the system insures that this capability can be provided at a much lower cost than installing fiber, thereby taking advantage of the distance insensitivity of satellite-based service. It is also particularly attractive at making first and last mile connections, which is a problem with the present copper and optical fiber cable systems.

Figure 4:
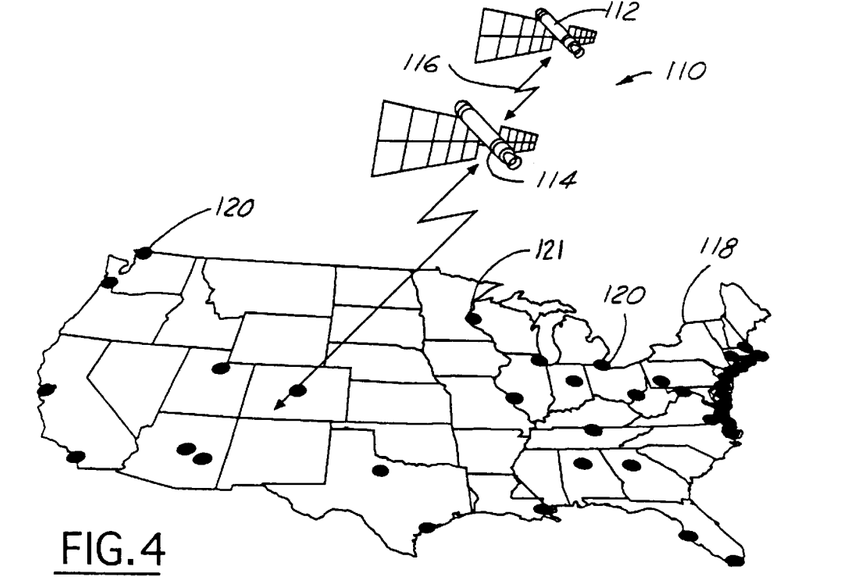
FIG. 4 is a schematic illustration of a portion of a constellation of communications satellites utilized in the present invention.

Referring now to FIG. 4, the present invention is suitable for use in a satellite system 110 generally depicted by a first satellite 112 and a second satellite 112. Satellites 112 and 114 are generally interconnected by an optical link generally represented by arrows 116. As shown on map 118, the footprint 120 of various regions of desired coverage are illustrated. A second beam 121 is generated by satellite 112. Second beam 121 may have a different diameter than beams 120. By using different satellites the size of the beam may be different between the satellites. Satellites 112, 114 may be MEOs, LEOs or GEOs. As mentioned above, satellites 114 and 112 may be reconfigured to provide coverage for each of footprints 120. One problem, however, with satellites 112 and 114 is that if a high frequency is used, the beams generated by satellites 112 and 114 cover only a narrow area. Therefore, coverage may not extend entirely over CONUS.

Figure 5:
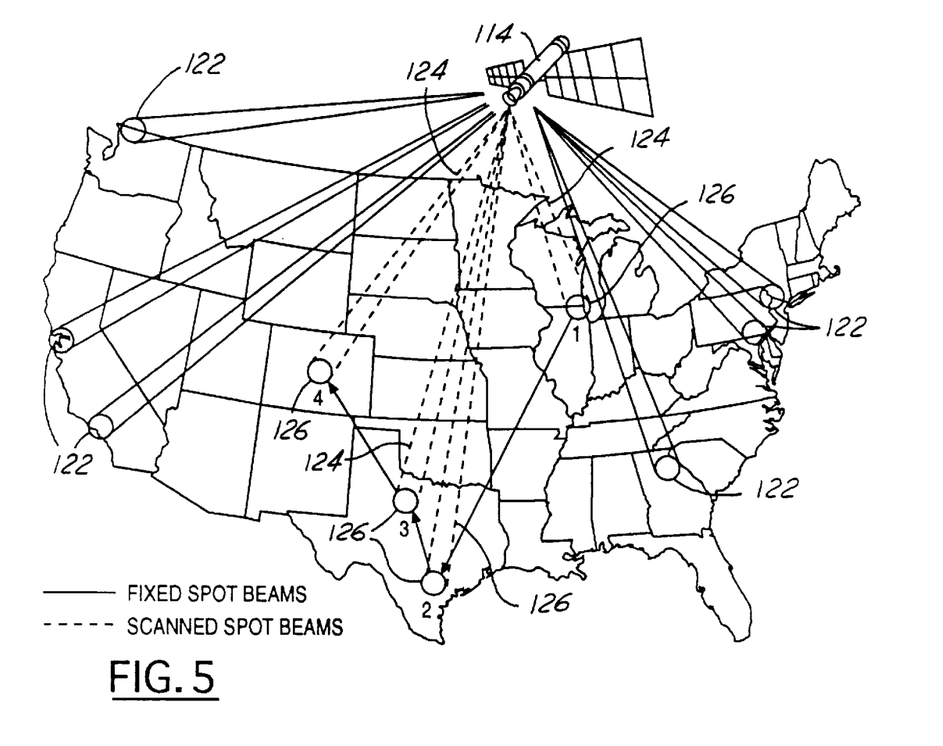
FIG. 5 is a schematic illustration of a satellite operating both scanned beams and fixed beams.

Referring now to FIG. 5, satellite 114 generates a plurality of fixed spot beams 122. Fixed spot beams may be repositioned as described above. The spot beams are used to both transmit and receive information. To further expand the coverage provided by satellite 114, a plurality of scanned spot beams 124 may also be used. As illustrated, one scanned spot beam 124 with footprints 126 is illustrated. Scanned spot beams 124 may be used to provide coverage to lower traffic areas which would otherwise not fully utilize a fixed spot beam 122. The combination of the scanned spot areas more fully utilize the beam capacity. Also, the use of scanned beams may be used in conjunction with other beams in the same area. That is, beams of narrow diameter may be interlaced with wider beams. This would promote frequency reuse in highly populated regions.

Both scanned spot beams 124 and fixed spot beams 122 are generated from the same antennas. As will be described below, each of the transmitting and receiving elements of the antenna may be reconfigured to be fixed spot beams 122 or scanned spot beams 124.

Figure 6:
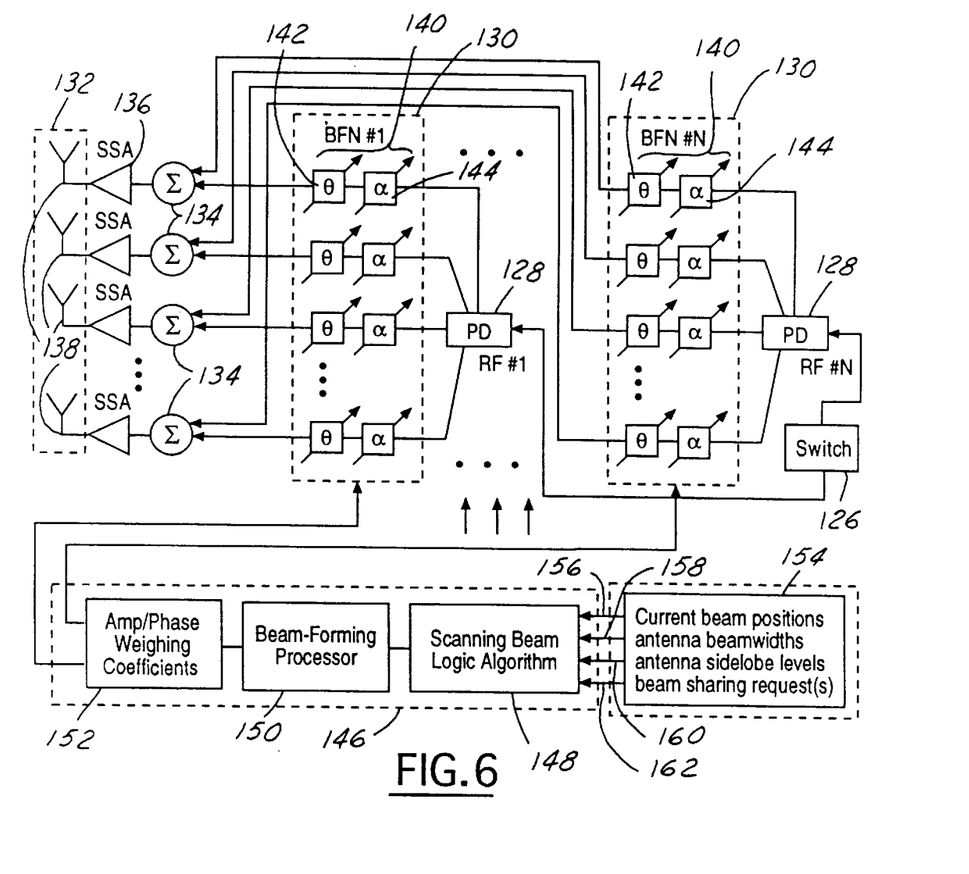
FIG. 6 is a block diagram of a transmitter according to the present invention.

Referring now to FIG. 6, signals to be transmitted to earth are routed through switch 126. Switch 126 may, for example, be a TDMA switch shown at 62 in FIG. 2. Switch 126 directs signals to be transmitted through power dividers 128 to beam forming networks 130. Usually, a plurality of beams are formed by the satellite. Each beam has a beam forming network 130 and a power divider 128.

Beam forming networks 130 are coupled to a transmitting antenna 132. Preferably, beam forming networks are coupled to transmitting antenna 132 through a summer 134 and a solid state amplifier 136 in a conventional manner. Transmitting antenna 132 may, for example, be a multiple beam array antenna or a phased array antenna. Of course, other types of antennas may be used according to the teachings of the present invention. Transmitting antenna 132 has a plurality of transmitting elements 138. Transmissions from transmitting elements 138 form a beam that is transmitted to the earth. As described above, the beams generated by transmitting elements 138 may be fixed or scanned. Each beam forming network 130 has a plurality of beam forming elements 140. As illustrated, beam forming elements 140 have a phase coefficient 142 and an amplitude coefficient 144. Each of phase coefficients 142 and amplitude coefficients 144 are independently tunable or adjustable.

Generally, to form a scanned beam, only phase coefficients 142 within the associated beam forming network needs to be adjusted. The phase elements provide a time delay which, when summed with the other elements of the associated beam forming network, effectively steers the beam away from the perpendicular to the antenna array plane. It is believed that up to 1,000 changes of phase coefficient 142 may be performed per second. Preferably, each transmitting element 138 has an associated phase coefficient 142. This allows the satellite to have maximum versatility. To have a fixed beam, the phase coefficient 142 may remain stable or unchanged.

In certain situations, it may also be helpful to adjust amplitude coefficient 144. This may be done to assist in beam steering. By changing amplitude coefficients 144 with the associated beam forming network, better control of side lobe levels of the transmitted beam may be achieved. That is, at the edge of the beam, the amplitude levels of the transmitted signal is preferably reduced. This prevents or reduces interference with adjacent beams. By reducing interference between adjacent beams, frequency reuse is promoted.

A controller 146 controls the operation of beam forming network and controls the calculation of the phase coefficients 142 and amplitude coefficients 144. Although controller 146 may have other functions, the controller of the present invention at least has a scanning beam logic algorithm 148, a beam-forming processor 150, and an amplitude phase weighting coefficient generator 152. Controller 146 has a plurality of beam characteristic inputs 154. Although a variety inputs may be used for beam forming, a current beam position input 156, an antenna beam width input 158, an antenna side lobe level input 160, and a beam sharing request input 162 are illustrated. Various events take place in controller 146 to insure that the generated beam has the proper direction and does not interfere with other beams that are being generated or that have been requested to be generated by the satellite. Scanning beam logic algorithm 146 uses current beam position input 156 and beam sharing request 162 to determine whether the beam that is to be generated will interfere with any of the beams that are or will be generated by antenna elements 138. Antenna beam width input 158 may also be used. Antenna beam width input 158 is generated by a calibration that is typically performed before the satellite is launched. By knowing the geometry of the transmitting elements 138, an actual beam can be transmitted and measured for each of the elements. Due to the great distances that signals are transmitted, a slight change in the geometry of the transmitting element 138 may cause the beam width to vary. Beam forming processor 150 is coupled to scanning beam logic algorithm 148. Once scanning beam logic algorithm 148 checks to determine whether the beam that is requested is acceptable, beam forming processor 150 chooses the proper beam forming network for the generation of the requested beam.

Amplitude phase and weighting coefficients portion of controller 146 generates phase coefficients 142 and amplitude coefficients 144. As discussed above, phase coefficients 142 are used to direct the beam to the proper angle with respect to the array plane. Also as described above, it may be important to control the antenna side lobe levels of the generated beam. By controlling amplitude coefficients 144 and by monitoring antenna side lobe level input 160, amplitude and phase weighting coefficient generator 152 may properly control the side lobe levels to prevent interference with adjacent beams.

Figure 7:
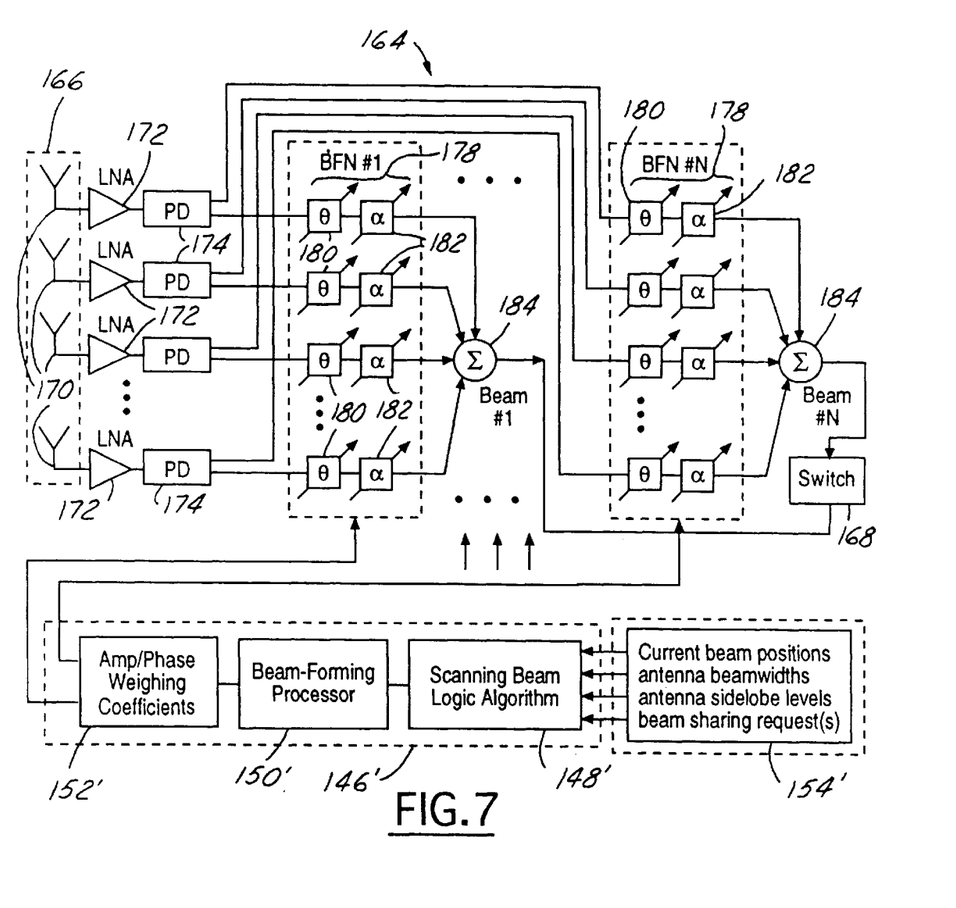
FIG. 7 is a block diagram of a receiver according to the present invention.

Referring now to FIG. 7, a receiving network 164 is illustrated. Receiving network 164 operates in a similar manner to that described above with respect to the transmitting network illustrated in FIG. 6 except that the signals originate with an uplink antenna 166, which transmits the signals ultimately to a switch 168. Switch 168 may be the same switch as switch 126 of FIG. 6. Uplink antenna 166 has a plurality of receiving elements 170. Each receiving element 170 is coupled to a low noise amplifier 172 and a power divider 174. Each receiving element 170 is coupled through low noise amplifiers (LNA) 172 and power dividers 174 to receiving beam forming networks 176. Preferably, the signal is amplified in low noise amplifier prior to power division.

Receiving beam forming networks 176 have beam forming elements 178 similar to that of beam forming elements 140 of FIG. 6. Beam forming elements 178 have phase coefficients 180 and amplitude coefficients 182. Phase coefficients 180 essentially steer the direction of the beam of the receiving elements 170 in a similar manner as that described in conjunction with transmitting by using different phase coefficients 142. The sum of each beam forming element 178 is added together in summer 184. Summer 184 forms the signal which is transmitted to switch 168 within the satellite. The received beam may be retransmitted through the same satellite or may be transmitted to another satellite by switch 168 through an optical interface as described above.

The controller 146', scanning beam logic algorithm 148', beam forming processor 150', and amplitude and phase weighting coefficient generator 152' all operate in a similar manner and based on beam characteristics 154'. The operation of processor is essentially the same as that described in FIG. 6.

Figure 8:
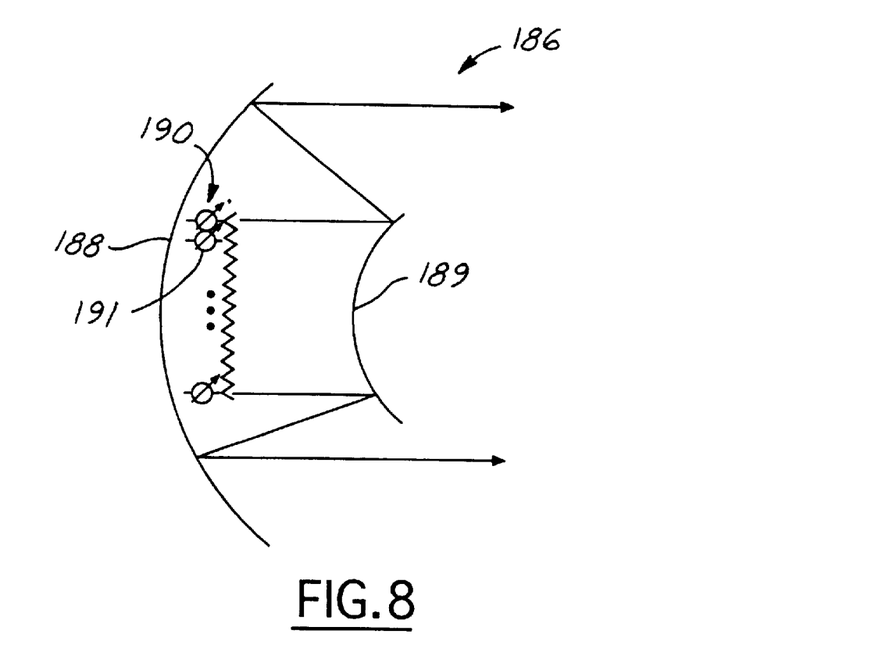
FIG. 8 is a schematic view of a first example of a suitable antenna.

Referring now to FIG. 8, a near-field Cassegrainian antenna 186 is illustrated as one of many suitable antennas. Antenna 186 has a reflector 188 and a subreflector 189. In this example, a phased-array feed 190 has a plurality of transmitting elements 191. The transmitting elements 191 are coupled to a beam forming network as described above.

Figure 9:
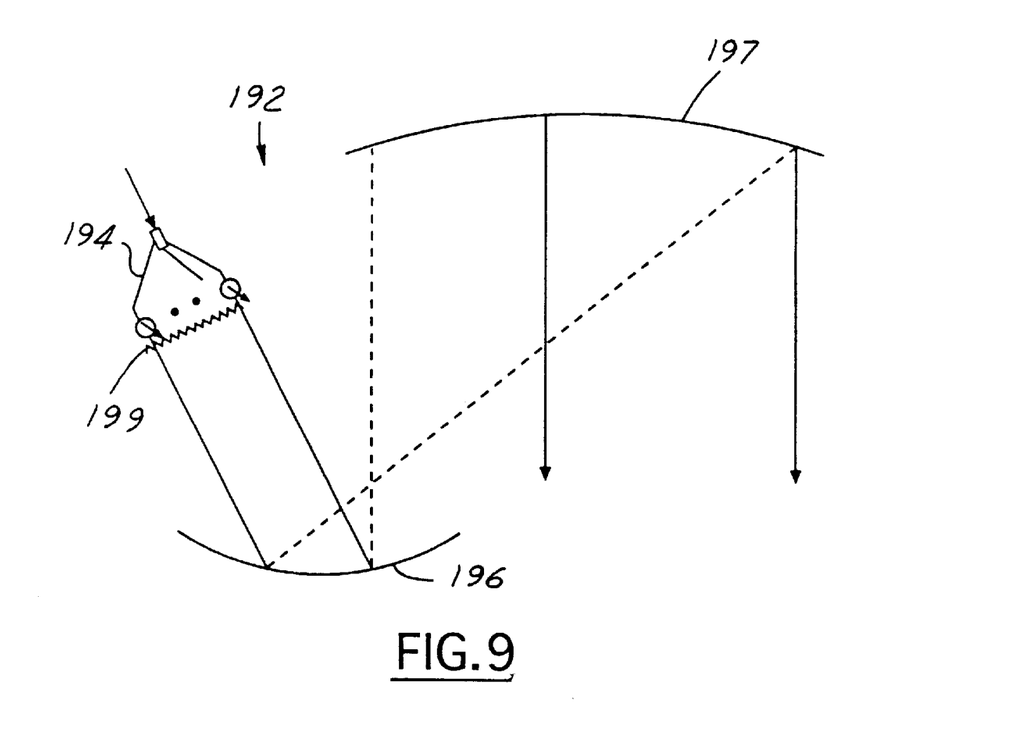
FIG. 9 is a schematic view of a second example of a suitable antenna.

Referring now to FIG. 9, an offset-fed Gregorian antenna is illustrated having a phase-array feed 194 having transmitting elements 195. Transmitting elements 199 transmit or receive signals from an offset subreflector 196 that directs the signals to or receives signals from a reflector 197.

The antenna designs illustrated in FIGS. 8 and 9 are representative of two suitable antenna designs. However, other antenna designs may also be suitable for use in transmitting and receiving various signals using scanned beams.

In operation, the beams for transmitting and receiving signals to and from a ground station are similar. The satellite 114 has several fixed spot beams and scanned spot beams that are allocated according to the usage of the satellite. As described above, cities or regions of the country having sufficient usage to support a dedicated fixed spot beam have phase parameters that remain fixed unless reconfigured. Scanned spot beams 126 may scan several regions of land mass so that the full capacity of the scanned spot beam is extensively utilized. To obtain the proper direction, the phase coefficients of the beam forming network are adjusted.

The processor calculates the proper phase coefficient by reviewing several inputs such as the current beam position, the antenna beam width, the antenna side lobe levels, and the beam sharing requests of the other beams.

If side lobe characteristics are important, the side lobe input 160 may be used to monitor the side lobe characteristics. Amplitude and phase weighting coefficient generator 152 may be used to generate various amplitudes to be directed to beam forming network. By controlling the side lobe of the formed beam, interference with other beams may be minimized or eliminated.

While the best modes for carrying out the invention have been described in detail, those familiar with the art to which this invention relates will recognize various alternative designs and embodiments for practicing the invention as defined by the following claims.

What is claimed is:

1. A satellite comprising:

a plurality of beam inputs;

an uplink antenna having a plurality of antenna receiving elements and a first reflector positioned adjacent to said plurality of antenna receiving elements;

a receive beam forming network coupled to said plurality of antenna receiving elements, said receiving beam forming network having a plurality of tunable receiving beam forming elements, each of said tunable receiving beam forming elements coupled to one of said antenna receiving elements and each of said tunable receiving beam forming elements having a receiving phase coefficient;

a downlink antenna having a plurality of antenna transmitting elements and a second reflector positioned adjacent to said plurality of antenna transmitting elements;

a transmitting beam forming network coupled to said plurality of antenna transmitting elements, said transmitting beam forming network having a plurality of tunable transmitting beam forming elements, each of said tunable transmitting beam forming elements coupled to one of said antenna transmitting elements and each of said tunable transmitting beam forming elements having a transmitting phase coefficient;

a controller coupled to said transmitting beam forming network, said receiving beam forming network and said beam forming inputs, said controller calculating and adjusting said transmitting and receiving phase coefficients in response to said beam forming inputs, said controller selecting either fixed spot coverage area or a scanned spot coverage by generating respective uplink spot beams and uplink scanned spot beams or by generating respective downlink spot beams and downlink scanned spot beams for each of the receiving and transmitting antenna elements, said first reflector directing both said uplink spot beams and said uplink scanned spot beams and said second reflector directing both said downlink spot beams and said downlink scanned spot beams.

2. A satellite as recited in claim 1 wherein said transmitting tunable beam forming network comprises a transmitting amplitude coefficient.

3. A satellite as recited in claim 2 wherein said beam input comprises a side lobe level input.

4. A satellite as recited in claim 3 wherein said transmitting amplitude coefficient is adjusted in response to said antenna side lobe level.

5. A satellite as recited in claim 1 wherein said receiving tunable beam forming network comprises a receiving amplitude coefficient.

6. A satellite as recited in claim 1 further comprising a transmitting power divider coupled to said transmitting beam forming network and a receiving power divider coupled to said receiving beam forming network.

7. A satellite as recited in claim 6 further comprising plurality of a low noise amplifiers coupled between each of said receiving elements and said receiving power divider.

8. A satellite as recited in claim 6 further comprising a solid state amplifier coupled to said transmitting beam forming elements.

9. A satellite as recited in claim 1 wherein said controller comprises a beam-forming processor.

10. A satellite as recited in claim 1 wherein said beam input comprises current beam position, antenna beam width and beam sharing requests.

11. A system for providing high frequency data communications in a satellite-based communications network, the system comprising:

a plurality of communications satellites each having an uplink antenna and a downlink antenna capable of receiving and transmitting a plurality of signals utilizing a plurality of beams having fixed spot beams and scanned spot beams to a plurality of spot coverage areas and a plurality of scanned spot areas respectively at a predetermined range of frequencies, the plurality of satellites each further having receiving and transmitting beam forming networks coupled to the uplink and downlink antennas respectively, said uplink antenna having a continuous array of reconfigurable receiving antenna elements and said downlink antenna having a continuous array of reconfigurable transmitting antenna elements; and a controller located on said satellite coupled to each of said transmitting and receiving beam forming networks, said controller selecting either fixed spot coverage area or a scanned spot coverage by generating respective uplink spot beams and uplink scanned spot beams or by generating respective downlink spot beams and downlink scanned spot beams for each of the reconfigurable receiving and transmitting antenna elements; and a first reflector positioned adjacent to said first plurality of receiving elements and a second reflector positioned adjacent to said plurality of transmitting elements, said first reflector directing both said uplink spot beams and said uplink scanned spot beams and said second reflector directing both said downlink spot beams and said downlink scanned spot beams.

12. A satellite comprising:

an uplink antenna having a plurality of antenna receiving elements arranged in a first continuous array, each of said receiving elements being reconfigurable to form receiving fixed spot beams and receiving scanned spot beams;

a receive beam forming network coupled to said plurality of antenna receiving elements, said receiving beam forming network coupled to said plurality of antenna receiving elements for configuring said antenna receiving elements into said receiving fixed spot beams and said receiving scanned spot beams;

a downlink antenna having a plurality of antenna transmitting elements arranged in a second continuous array, each of said transmitting elements being reconfigurable to form transmitting fixed spot beams and transmitting scanned spot beams; and a transmitting beam forming network coupled to said plurality of antenna transmitting elements, said transmitting beam forming network coupled to said plurality of antenna transmitting elements for configuring said antenna transmitting elements into said transmitting fixed spot beams and said transmitting scanned spot beams.

* * * * *